(12) United States Patent
Scott (10) Patent No.: US 11,818,983 B2
(45) Date of Patent: Nov. 21, 2023

(54) GUAYULE HARVESTER AND RELATED PROCESSES

(71) Applicant: Bridgestone Corporation, Tokyo (JP)

(72) Inventor: Jody Scott, Mesa, AZ (US)

(73) Assignee: Bridgestone Corporation, Chuo-ku (JP)

( * ) Notice: Subject to any disclaimer, the term of this patent is extended or adjusted under 35 U.S.C. 154(b) by 737 days.

(21) Appl. No.: 14/854,468

(22) Filed: Sep. 15, 2015

(65) Prior Publication Data

US 2016/0081265 A1 Mar. 24, 2016

Related U.S. Application Data

(60) Provisional application No. 62/053,180, filed on Sep. 21, 2014.

(51) Int. Cl.
*A01D 45/00* (2018.01)

(52) U.S. Cl.
CPC .................................. *A01D 45/00* (2013.01)

(58) Field of Classification Search
CPC ...... A01D 13/00; A01D 17/10; A01D 17/101; A01D 45/00
See application file for complete search history.

(56) References Cited

U.S. PATENT DOCUMENTS

| | | | | |
|---|---|---|---|---|
| 63,475 | A | * | 4/1867 | Conover ................ A01D 13/00 171/67 |
| 860,227 | A | * | 7/1907 | Moreau ................ A01D 13/00 171/112 |
| 975,586 | A | | 11/1910 | Wadhams |
| 1,131,465 | A | | 3/1915 | Brandt |
| 1,193,746 | A | | 8/1916 | Winters |
| 1,483,024 | A | | 2/1924 | Travis et al. |
| 1,748,745 | A | | 2/1930 | Zuckerman |
| 1,960,857 | A | * | 5/1934 | Stoltenberg ............ A01D 17/00 171/119 |

(Continued)

FOREIGN PATENT DOCUMENTS

| | | |
|---|---|---|
| AU | 2003770 A | 3/1972 |
| CN | 101828471 A | 9/2010 |

(Continued)

OTHER PUBLICATIONS

Özbil Tarim Makineleri, Dated Jul. 15, 2013, Retrieved on Jan. 4, 2020, Facebook, <https://www.facebook.com/photo.php?fbid=139767712897574> (Year: 2013).*
"Commercial Potato Production in North America," Second Revision of American Potato Journal Supplement vol. 67 and USDA Handbook 267 by the Extension Section of The Potato Association of America, Oct. 26, 2010.

(Continued)

*Primary Examiner* — Thomas B Will
*Assistant Examiner* — Joel F. Mitchell
(74) *Attorney, Agent, or Firm* — Meredith E. Hooker; Jenny L. Sheaffer (57) ABSTRACT

A harvester for harvesting guayule shrubs from the soil in which they are grown. The harvester can include a wheeled frame, a pair of laterally spaced sidewalls on the frame, a front conveyor positioned between the pair of laterally spaced sidewalls, a forward projecting digger blade positioned forward of the front conveyor, and an agitator for separating residual soil from uprooted guayule shrubs. Processes for harvesting guayule shrubs using the harvester to uproot the guayule shrubs.

17 Claims, 4 Drawing Sheets

(56) References Cited

U.S. PATENT DOCUMENTS

| | | | |
|---|---|---|---|
| 1,990,172 A | 2/1935 | Falkiner et al. | |
| 2,073,041 A | 3/1937 | Wolter | |
| 2,075,311 A | 3/1937 | Stockl et al. | |
| 2,282,679 A * | 5/1942 | Smith | A01D 17/02 171/130 |
| 2,314,681 A | 3/1943 | Bealty | |
| 2,348,634 A | 5/1944 | McEachern | |
| 2,452,418 A | 5/1944 | Zuckerman | |
| 2,367,278 A | 1/1945 | Hewlett | |
| 2,400,667 A | 5/1946 | Toews | |
| 2,522,308 A | 1/1948 | Silva | |
| 2,436,831 A | 3/1948 | Silva | |
| 2,451,130 A | 10/1948 | Townsend | |
| 2,468,639 A | 4/1949 | Sample | |
| 2,472,360 A * | 6/1949 | Wright | A01D 13/00 171/83 |
| 2,473,655 A | 6/1949 | Lohn | |
| 2,509,970 A | 5/1950 | Edmonds | |
| 2,514,338 A | 7/1950 | Roberts | |
| 2,559,965 A | 7/1951 | Innes | |
| 2,634,569 A | 4/1953 | Raney et al. | |
| 2,641,888 A | 6/1953 | Grether | |
| 2,645,889 A | 7/1953 | Warner | |
| 2,693,069 A | 11/1954 | Krier | |
| 2,724,228 A * | 11/1955 | Duncan | A01D 45/10 56/13.7 |
| 2,747,354 A | 5/1956 | Bloser | |
| 2,791,076 A | 5/1957 | Richardson | |
| 2,808,865 A | 10/1957 | Duncan et al. | |
| 2,812,631 A | 11/1957 | Koch | |
| 2,826,031 A | 3/1958 | Hansen | |
| 2,833,358 A | 5/1958 | Lust | |
| 2,855,058 A | 10/1958 | Krier et al. | |
| 2,867,068 A | 1/1959 | Dumanowski | |
| 2,896,728 A * | 7/1959 | Pridy | A01D 17/00 171/130 |
| 2,897,900 A * | 8/1959 | Huddle | A01D 17/10 171/126 |
| 2,902,997 A | 9/1959 | Hawkins et al. | |
| 2,953,886 A | 9/1960 | Douglas et al. | |
| 3,005,498 A * | 10/1961 | Huddle | A01D 17/10 171/109 |
| 3,031,828 A | 5/1962 | Graham | |
| 3,042,123 A * | 7/1962 | Fry | A01D 13/00 171/136 |
| 3,078,926 A | 2/1963 | Ries et al. | |
| 3,106,249 A | 10/1963 | Zachary | |
| 3,108,416 A | 10/1963 | Bopf et al. | |
| 3,141,281 A | 7/1964 | Gaunt et al. | |
| 3,168,145 A | 2/1965 | Gunkel et al. | |
| 3,194,318 A | 7/1965 | Boyer | |
| 3,199,604 A | 8/1965 | Lorenzen et al. | |
| 3,227,276 A * | 1/1966 | Leighton et al. | A01D 33/08 171/14 |
| 3,262,503 A | 7/1966 | Zijlstra et al. | |
| 3,286,774 A | 11/1966 | Lorenzen et al. | |
| 3,307,338 A | 3/1967 | Mizzi | |
| 3,335,553 A | 8/1967 | Medd | |
| 3,340,935 A * | 9/1967 | Csimma | A01D 45/006 171/130 |
| 3,353,342 A | 11/1967 | Hill et al. | |
| 3,434,271 A | 3/1969 | Gaunt et al. | |
| 3,472,009 A | 10/1969 | Porter | |
| 3,473,613 A | 10/1969 | Boyce | |
| 3,518,818 A | 7/1970 | Porter | |
| 3,543,493 A | 12/1970 | Duda, Jr. | |
| 3,548,570 A * | 12/1970 | Knott et al. | A01D 45/10 56/10.2 R |
| 3,587,217 A | 6/1971 | Harriott | |
| 3,603,067 A | 9/1971 | Wilde | |
| 3,624,990 A | 12/1971 | Sinden et al. | |
| 3,633,677 A | 1/1972 | Walker | |
| 3,653,194 A | 4/1972 | Lachman | |
| 3,690,049 A | 9/1972 | Roberson | |
| 3,698,164 A | 10/1972 | Boone et al. | |
| 3,743,024 A | 7/1973 | Mayo et al. | |
| 3,747,312 A | 7/1973 | Duncan | |
| 3,800,518 A | 4/1974 | Baggiolini | |
| 3,808,783 A | 5/1974 | Sutherland et al. | |
| 3,810,512 A | 5/1974 | Porter | |
| 3,827,503 A | 8/1974 | Hansen | |
| 3,921,375 A | 11/1975 | Cetrulo | |
| 3,921,723 A | 11/1975 | Seem | |
| 3,940,913 A | 3/1976 | Wallenfang et al. | |
| 3,973,378 A | 8/1976 | Bartasevich et al. | |
| 3,986,324 A | 10/1976 | Harriott et al. | |
| 3,986,561 A | 10/1976 | Bettencourt et al. | |
| 3,990,217 A | 11/1976 | Aoyama | |
| 3,999,613 A | 12/1976 | Porter | |
| 4,009,557 A | 3/1977 | Reicks | |
| 4,122,901 A | 10/1978 | Koepplin | |
| 4,124,970 A | 11/1978 | Bernhardt | |
| 4,135,350 A | 1/1979 | Miyatake | |
| 4,136,509 A | 1/1979 | Lenker et al. | |
| 4,141,201 A | 2/1979 | Christensen | |
| 4,156,465 A | 5/1979 | Porter | |
| 4,231,431 A | 11/1980 | Weichel | |
| 4,234,045 A | 11/1980 | Porter | |
| 4,257,218 A * | 3/1981 | McRobert | A01D 45/006 171/26 |
| 4,261,163 A | 4/1981 | Shaw | |
| 4,275,649 A | 6/1981 | Petersen et al. | |
| 4,326,590 A | 4/1982 | Yancey | |
| 4,335,570 A | 6/1982 | Fitzmaurice | |
| 4,365,463 A | 12/1982 | Bettencourt et al. | |
| 4,367,622 A | 1/1983 | Aron et al. | |
| 4,408,441 A | 10/1983 | Willett | |
| 4,416,334 A * | 11/1983 | Bouillon | A01D 17/06 171/126 |
| 4,426,832 A | 1/1984 | Porter | |
| 4,470,245 A | 9/1984 | Agadi | |
| 4,548,275 A | 10/1985 | Squier | |
| 4,553,381 A | 11/1985 | Sonnenberg | |
| 4,722,175 A | 2/1988 | Hobhouse | |
| 4,727,714 A | 3/1988 | Karakolev et al. | |
| 4,738,036 A | 4/1988 | Belanger | |
| 4,753,296 A * | 6/1988 | Kruithoff | A01D 17/10 171/17 |
| 5,058,369 A | 10/1991 | Garner | |
| 5,060,732 A | 10/1991 | Baskett | |
| 5,077,964 A | 1/1992 | Kabat | |
| 5,092,110 A | 3/1992 | Dommert et al. | |
| 5,099,636 A | 3/1992 | Yoder | |
| 5,193,331 A | 3/1993 | Quandt | |
| 5,197,269 A | 3/1993 | Meester | |
| 5,253,468 A | 10/1993 | Raymond | |
| 5,287,685 A | 2/1994 | Morgan | |
| RE34,855 E | 2/1995 | Garner | |
| 5,479,726 A | 1/1996 | Bishop | |
| 5,480,353 A | 1/1996 | Garza, Jr. | |
| 5,622,034 A | 4/1997 | Dommert | |
| 5,653,633 A * | 8/1997 | Kalverkamp et al. | A01D 17/10 198/631.1 |
| 5,735,740 A | 4/1998 | Tarasenko et al. | |
| 5,799,474 A | 9/1998 | Ingram | |
| 5,862,657 A | 1/1999 | Saurette | |
| 5,904,032 A | 5/1999 | Rippel | |
| 5,964,081 A | 10/1999 | Ingram | |
| 6,050,073 A | 4/2000 | Nevarez, Sr. | |
| 6,173,559 B1 | 1/2001 | Nevarez, Sr. | |
| 6,212,864 B1 | 4/2001 | Harden et al. | |
| 6,282,877 B1 | 9/2001 | Yoder | |
| 6,293,078 B1 | 9/2001 | Deutsch et al. | |
| 6,378,281 B1 | 4/2002 | Ottaway | |
| 6,381,934 B2 | 5/2002 | Heard | |
| 6,412,260 B1 | 7/2002 | Lukac et al. | |
| 6,550,230 B2 | 4/2003 | Fox | |
| 6,622,467 B1 | 9/2003 | Ottaway | |
| 6,779,329 B2 | 8/2004 | Yoder et al. | |
| 7,073,315 B2 | 7/2006 | Nixon | |
| 7,166,027 B2 | 1/2007 | Messenger | |
| 7,322,177 B2 | 1/2008 | Geraghty | |
| 7,360,280 B2 | 4/2008 | Fox et al. | |

(56) References Cited

U.S. PATENT DOCUMENTS

| | | |
|---|---|---|
| 7,473,168 B2 | 1/2009 | Day et al. |
| 7,559,188 B2 | 7/2009 | Behmlander |
| 7,581,375 B2 | 9/2009 | Meester |
| 7,694,502 B2 | 4/2010 | Meester |
| 7,866,136 B1 | 1/2011 | Hill et al. |
| 7,874,134 B1 | 1/2011 | Hoffman |
| 7,921,628 B2 | 4/2011 | Meester |
| 7,926,250 B2 | 4/2011 | Wagner et al. |
| 7,966,796 B2 | 6/2011 | Leach et al. |
| 8,024,914 B2 | 9/2011 | Pilatti |
| 8,123,598 B2 | 2/2012 | Barthet |
| 8,266,881 B2 | 9/2012 | McIlwain |
| 8,312,701 B1 | 10/2012 | Albarran et al. |
| 8,479,484 B2 | 7/2013 | Nakas et al. |
| 8,615,978 B2 | 12/2013 | Hinds |
| 8,631,635 B2 | 1/2014 | Albarran et al. |
| 2008/0172998 A1* | 7/2008 | Fraley et al. .......... A01D 43/06 56/14.6 |
| 2011/0232249 A1 | 9/2011 | McIlwain |
| 2012/0311989 A1 | 12/2012 | Albarran et al. |
| 2012/0321757 A1 | 12/2012 | Foley |
| 2013/0008674 A1* | 1/2013 | Kashti et al. .......... A01D 29/00 171/1 |
| 2013/0014482 A1 | 1/2013 | Hadley |
| 2014/0288255 A1* | 9/2014 | Martin et al. .......... C08C 2/02 526/340.4 |

FOREIGN PATENT DOCUMENTS

| | | | |
|---|---|---|---|
| CN | 201718225 U | 1/2011 | |
| DE | 3309281 A1 * | 9/1984 | ............ A01D 15/04 |
| EP | 113335 B1 | 9/1987 | |
| EP | 0587894 B1 | 10/1997 | |
| EP | 0613616 B1 | 6/1998 | |
| EP | 1156713 B1 | 7/2003 | |
| FR | 2503982 A1 | 10/1982 | |
| FR | 2504351 A1 | 10/1982 | |
| FR | 2681215 A1 | 3/1993 | |
| FR | 2709041 A1 | 2/1995 | |
| FR | 2941842 A1 | 8/2010 | |
| GB | 1401632 A | 7/1975 | |
| GB | 2373162 B | 1/2003 | |
| IT | 20110030 A1 | 12/2012 | |
| SU | 494146 A1 | 12/1975 | |
| WO | 2008091807 A2 | 7/2008 | |

OTHER PUBLICATIONS

Burpee "Potato Planter," downloaded from https://www.burpee.com/gardening-supplies/containers/potato-planterprod099942.html in Jul. 2018.

Ex parte Taskinen, decision of the Patent Trial and Appeal Board, U.S. Appl. No. 13/991,197, appeal No. 2020-002596, Oct. 28, 2020.

* cited by examiner

GUAYULE HARVESTER AND RELATED PROCESSES

CROSS-REFERENCE TO RELATED APPLICATION

This application claims priority to and any other benefit of U.S. Provisional Patent Application Ser. No. 62/053,180 filed Sep. 21, 2014, and entitled "GUAYULE HARVESTER," the entire disclosure of which is incorporated by reference herein.

FIELD OF THE INVENTION

The present application generally relates to a harvester for harvesting guayule shrubs from the soil in which they are grown and to related processes for harvesting guayule shrubs using the harvester.

BACKGROUND

The guayule plant (*Parthenium argentatum*) is a shrub-like plant that contains rubber within its cells. Guayule shrubs are generally planted in soil, frequently in rows, and may be grown for a period of years prior to harvesting. The shrub may be harvested by cutting the plant above the surface of the soil and leaving behind the root portion within the soil or by removing the entire plant including the root portion.

SUMMARY

Disclosed herein is a harvester for harvesting guayule shrub from soil. The harvester comprises: a wheeled frame including at least two wheels and having a forward end and a rearward end; a pair of laterally spaced sidewalls on said frame defining a passage extending from the forward end to the rearward end; a front conveyor positioned between the pair of laterally spaced sidewalls and inclined from the forward end toward the rearward end, the front conveyor capable of rearward rotation at a first speed; a forward projecting digger blade positioned forward of the front conveyor and capable of downward engagement into the soil for uprooting guayule shrub, the digger blade arranged to direct uprooted guayule shrub toward the front conveyor; and an agitator for separating residual soil from the uprooted guayule shrub conveyed by the front conveyor.

Also disclosed herein are processes for harvesting guayule shrubs using the harvester disclosed herein.

BRIEF DESCRIPTION OF THE DRAWINGS

Features and advantages of the present invention will become apparent to those of ordinary skill in the art to which the invention pertains from a reading of the following description together with the accompanying drawings, in which.

DETAILED DESCRIPTION

Disclosed herein is a harvester for harvesting guayule shrubs from the soil in which they are grown and related processes for harvesting guayule shrubs using the harvester.

Disclosed herein is a harvester for harvesting guayule shrub from soil. The harvester comprises: a wheeled frame including at least two wheels and having a forward end and a rearward end; a pair of laterally spaced sidewalls on said frame defining a passage extending from the forward end to the rearward end; a front conveyor positioned between the pair of laterally spaced sidewalls and inclined from the forward end toward the rearward end, the front conveyor capable of rearward rotation at a first speed; a forward projecting digger blade positioned forward of the front conveyor and capable of downward engagement into the soil for uprooting guayule shrub, the digger blade arranged to direct uprooted guayule shrub toward the front conveyor; and an agitator for separating residual soil from the uprooted guayule shrub conveyed by the front conveyor.

Also disclosed herein are processes for harvesting guayule shrubs using the harvester disclosed herein. As discussed further below, in certain embodiments, the process for harvesting guayule shrubs includes use of a tractor to attach the harvester, pull the harvester, power the harvester, or a combination thereof. In other embodiments, the process for harvesting guayule shrubs uses a harvester that is self-propelled by its own power source. In certain embodiments, the process for harvesting guayule shrubs includes conveying the uprooted shrubs via the harvester to the ground behind the harvester. In other embodiments, the process for harvesting guayule shrubs includes conveying the uprooted shrubs via the harvester to a wagon or other carrier associated with the harvester. In certain embodiments, the process includes movement of the front conveyor at a first speed and movement of the rear conveyor at a second speed which second speed is faster than the first speed.

Figure 1:
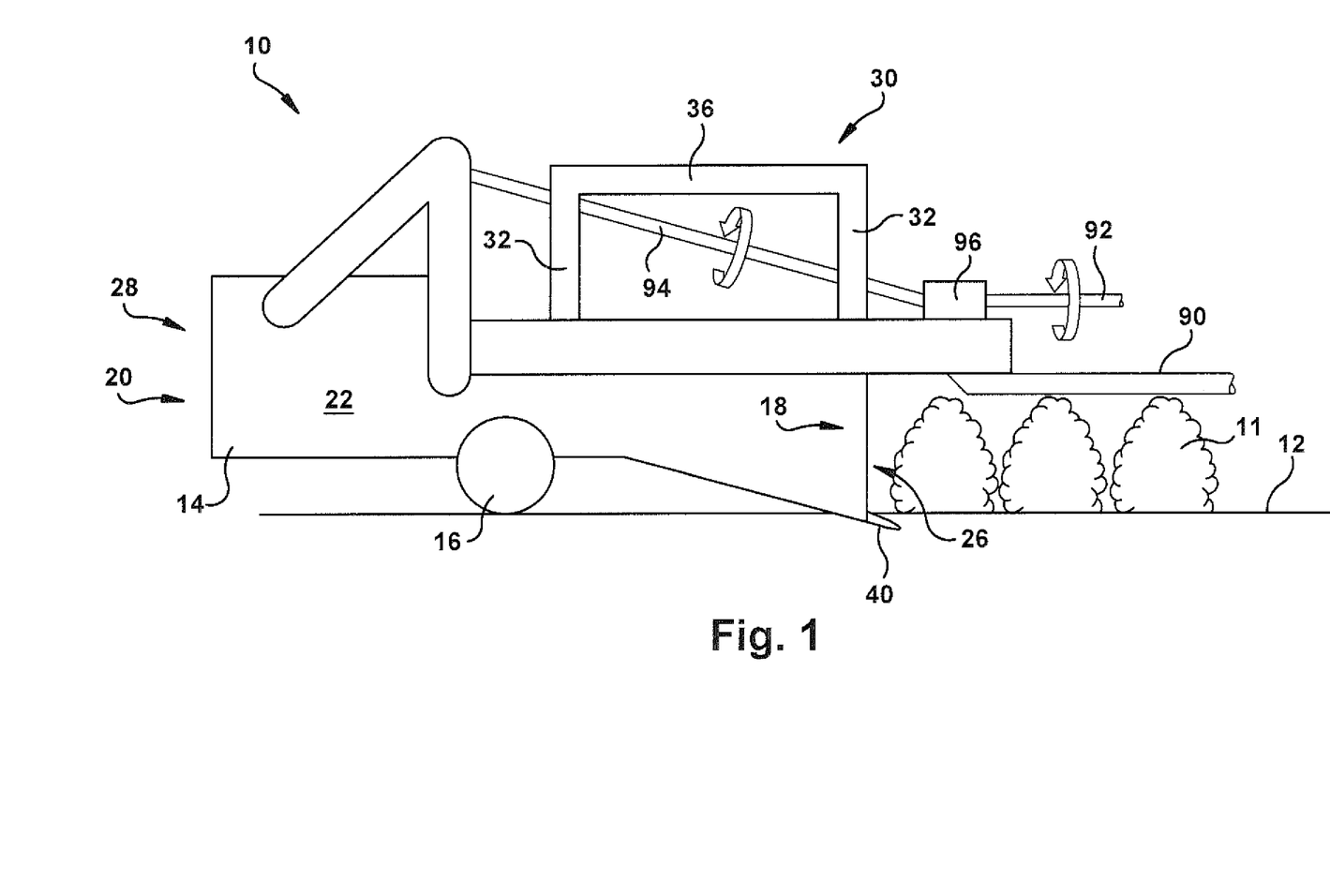
FIG. 1 is a side view of an exemplary embodiment of a harvester.

FIG. 1 is a side view of an exemplary embodiment of a harvester 10. The harvester 10 is designed to uproot small shrubs 11 from the soil 12 in which the shrubs are planted and convey the uprooted shrubs, with the roots intact, to a desired location, such as for example, a carrier associated with the harvester or a convenient location on the ground where the uprooted shrubs can be collected by another machine or manually. The harvester 10 can be configured in a variety of ways and can be used to harvest a variety of shrubs. For example, the harvester 10 may be used to harvest guayule shrubs (*Parthenium argentatum*). Any configuration capable of uprooting shrubs desired to be harvested and conveying them to a desired location may be used. In the exemplary embodiment, the harvester 10 includes a frame 14 having at least two wheels 16 rotatably attached to the frame to allow the harvester 10 to be wheeled or driven across the ground.

The frame 14 includes a forward end 18, a rearward end 20, and a pair of laterally spaced side walls 22. The side walls 22 define a passage 24 having an inlet 26 at the forward end 18 and an outlet 28 at the rearward end 20. A cage 30 engages and supports the pair of laterally spaced sidewalls 22. The cage 30 includes at least a pair of upwardly extending vertical support members 32. Although not visible in FIG. 1, both sides of the cage include upwardly extending vertical support members 32. Generally, the number of upwardly extending vertical support members is not particularly limited to any particular number and two, three, four or some other number may be used. The vertical support members 32 are connected laterally by one or more cross support members 34 and longitudinally by one or more longitudinal support members 36. The frame 14 includes a bottom end 36 that is open or partially open to the ground beneath the harvester 10.

Figure 3:
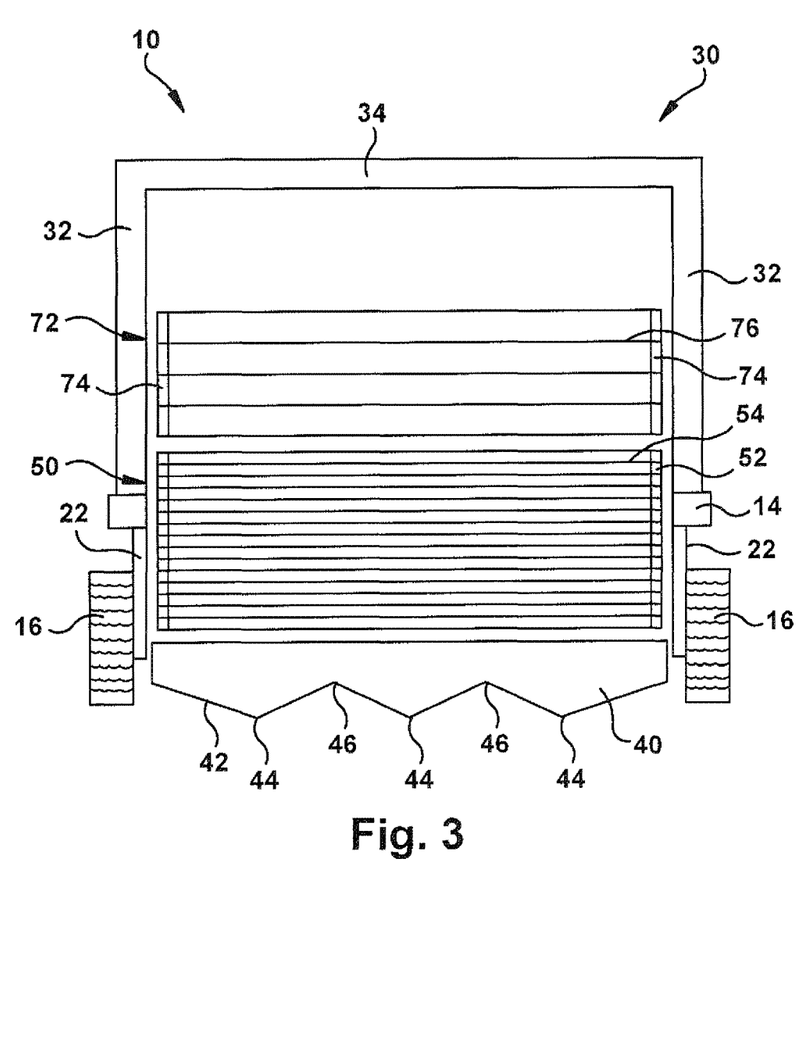
FIG. 3 provides an alternative view of the harvester of FIG. 1 and/or FIG. 2 including further details relating to the rear conveyor, front conveyor and digger blade.
Figure 5A:
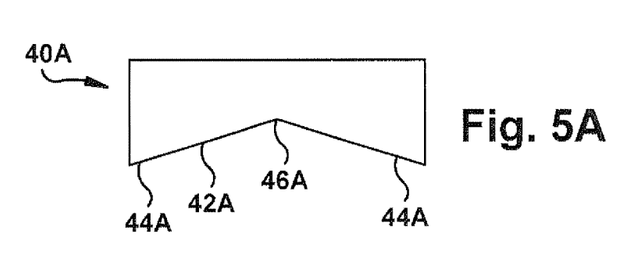
FIGS. 5A-5D illustrate exemplary embodiments of the front digger blade.
Figure 5B:
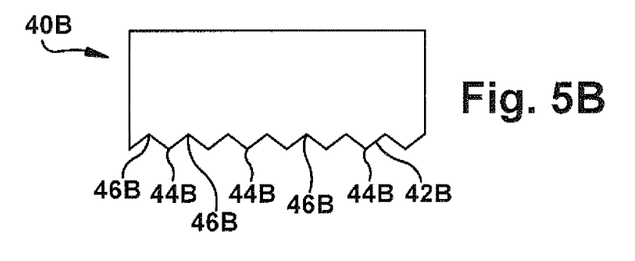
Figure 5C:
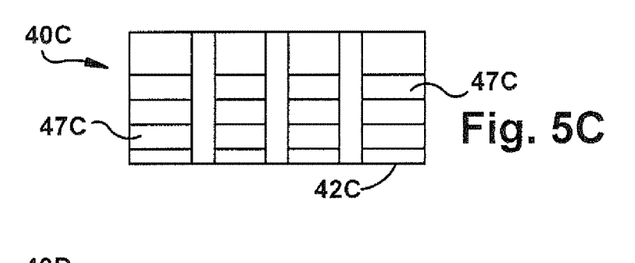
Figure 5D:
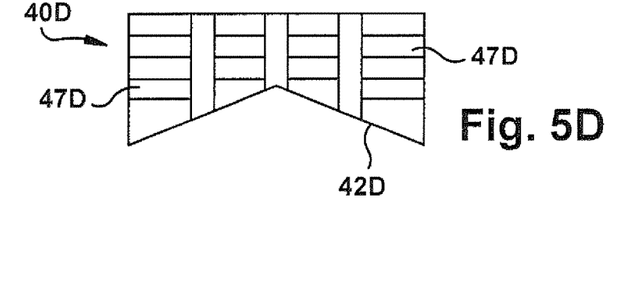

A forward projecting digger blade 40 is positioned on the forward end 18 of the frame 14. The digger blade is relatively flat with a thickness sufficient to withstand the stresses encountered during use. The digger blade 40 is capable of downward engagement into the soil 12 for uprooting guayule shrub. The digger blade 40 can be configured in a variety of ways. Any configuration capable of uprooting guayule shrubs with the roots intact, or mostly intact, may be used. In certain embodiments, during use of the harvester the digger blade will extend about 3 to about 10 inches (about 7.5 to about 25 cm) into the soil (below the surface of the ground). In certain embodiments, the digger blade will extend about 3 to about 10 inches (about 7.5 cm to about 25 cm) below the bottom plane formed by the wheels of the harvester. In certain embodiments, the extension is 3 to 10 inches (7.5 cm to 25 cm). When utilized to harvest guayule shrub, such an extension will enable the largest portion of the root to be harvested along with the above-the-ground portion of the shrub. In the exemplary embodiment, the digger blade 40 has a generally rectangular configuration and includes a jagged or irregular edge 42 having a plurality of peaks 44 and valleys 46 (FIG. 3). The jagged edge aids in penetrating the soil and uprooting and grabbing the guayule scrubs. FIGS. 5A-5D illustrate other exemplary embodiments of digger blades. The digger blade 40A of FIG. 5A is similar to the digger blade 40 of FIG. 3 except the jagged edge 42A of the blade has less peaks 44A and valleys 46A than the digger blade 40 (with the one valley designed to accommodate the shrub stem/trunk). The digger blade 40B of FIG. 5B is similar to the digger blade 40 of FIG. 3 except the jagged edge 42B has more peaks 44B and valleys 46B than the digger blade 40. The digger blade 40C of FIG. 5C is similar to the digger blade 40 of FIG. 3 except the edge 42C of the blade is substantially straight without peaks and valleys and the blade also includes a plurality of holes 47C extending through the blade to allow soil to pass through. The digger blade 40D of FIG. 5D is similar to the digger blade 40A of FIG. 5A except the blade includes a plurality of holes 47D extending through the blade similar to the blade 40C of FIG. 5C. The digger blade 40B can be configured similar to digger blades 40A and 40B, i.e., with a plurality of holes extending through the blade to allow soil to pass through. In certain embodiments where the digger blade has a plurality of holes extending through its surface, the holes may be formed in various shapes (squares, rectangles, circles, ovals, etc.) and may be formed in various ways such as by punching or cutting or upon manufacture of the digger blade (e.g., by forming it of bars or strips). In certain embodiments, the digger blade is made of steel, hardened steel or another steel-like alloy.

Figure 2:
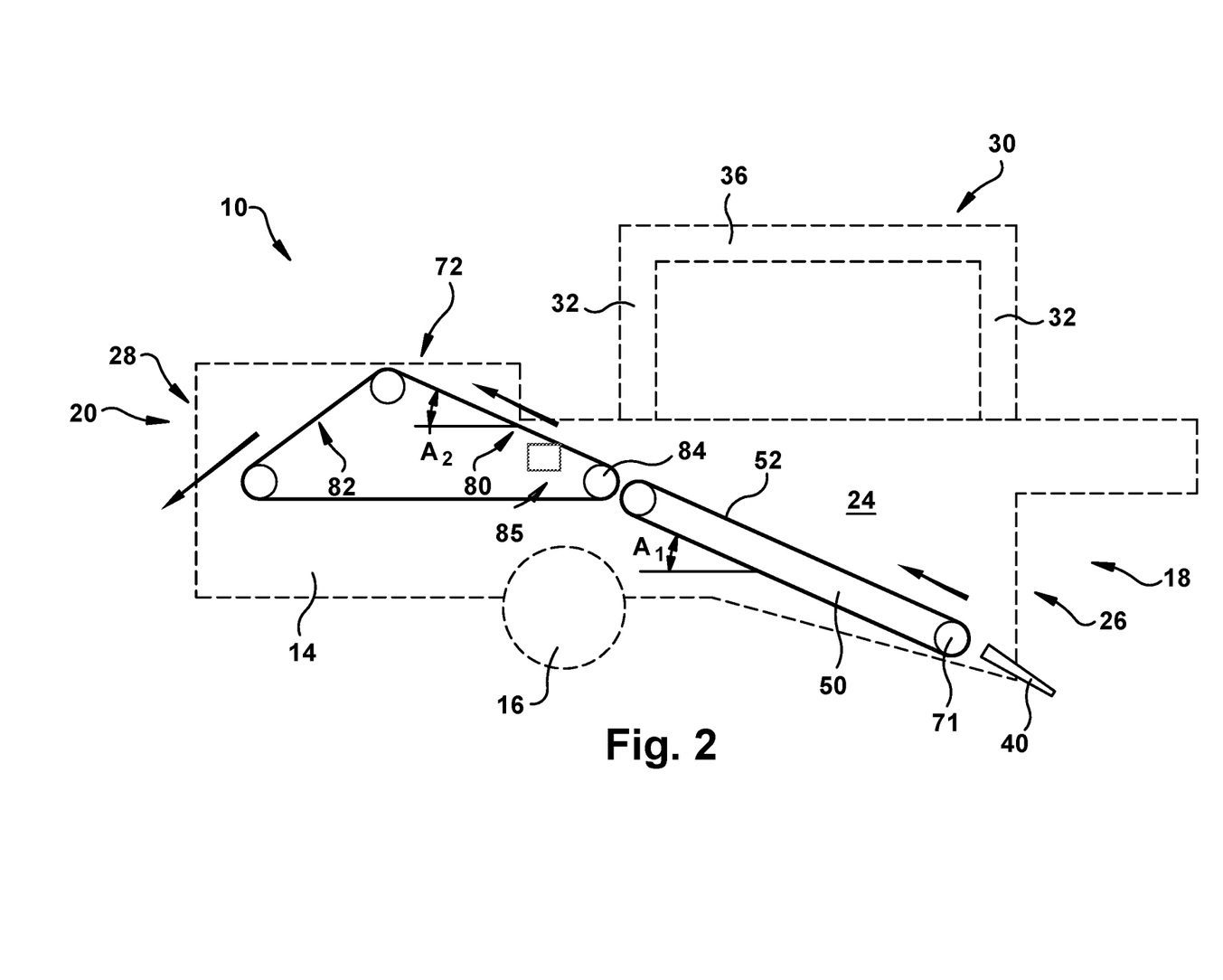
FIG. 2 provides a view of the rear conveyor and front conveyor of an exemplary embodiment of a harvester.

Referring to FIGS. 2 and 3, the harvester 10 includes one or more conveying assemblies for moving the uprooted shrubs with roots intact to a desired location. The one or more conveying assemblies may be configured in a variety of ways. Any conveying assembly capable of moving the uprooted shrubs with roots intact to a desired location while facilitating separating residual soil from the uprooted shrubs may be used. For example, the conveying assembly may include one conveyor or multiple conveyors. In the exemplary embodiment, the harvester 10 includes a front conveyor 50 positioned between the pair of laterally spaced sidewalls 22 and inclined from the forward end 18 toward the rearward end 20. The front conveyor 50 is inclined at an angle A1 in the range of about 20 degrees to about 50 degrees. In certain embodiments, the front conveyor 50 is inclined at an angle in the range of 20 to 50 degrees, about 25 to about 45 degrees, or 25 to 45 degrees. The front conveyor 50 includes at least a pair of endless chains or belts 52 and a plurality of parallel links 54 connected at their ends, in relation, to the pair of endless chains or belts. The parallel links 54 are substantially evenly spaced along the length of the chains or belts 52. In one exemplary embodiment, the front conveyor 50 forms regularly spaced openings 56 between the links 54 of about ½ inch to about 3 inches (about 0.125 cm to 7.5 cm). In certain embodiments, the regularly spaced openings 56 between the links 54 are ½ inch to 3 inches (0.125 cm to 7.5 cm), about 1 inch to about 2 inches (about 2.5 cm to 5 cm), or 1 inch to 2 inches (2.5 cm to 5 cm).

Figure 4A:
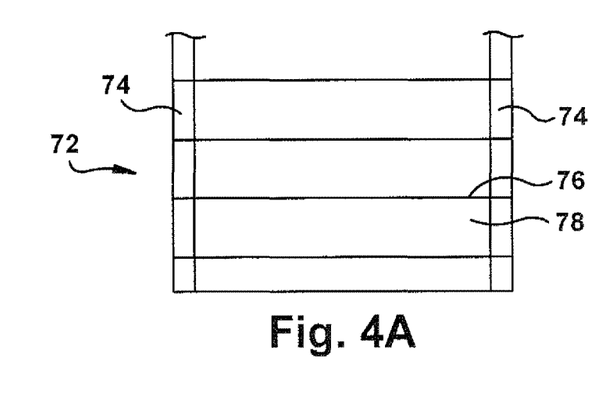
FIG. 4A illustrates a portion of the rear conveyor which includes chain or belts, parallel links and spaced openings between the links.
Figure 4B:
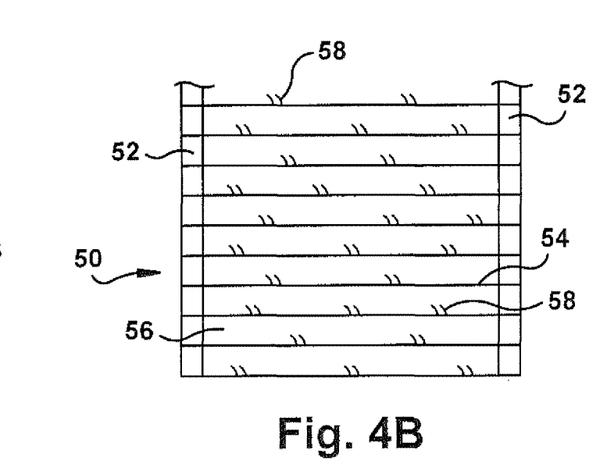
FIG. 4B illustrates a portion of the front conveyor with optional projections on the parallel links.
Figure 6:
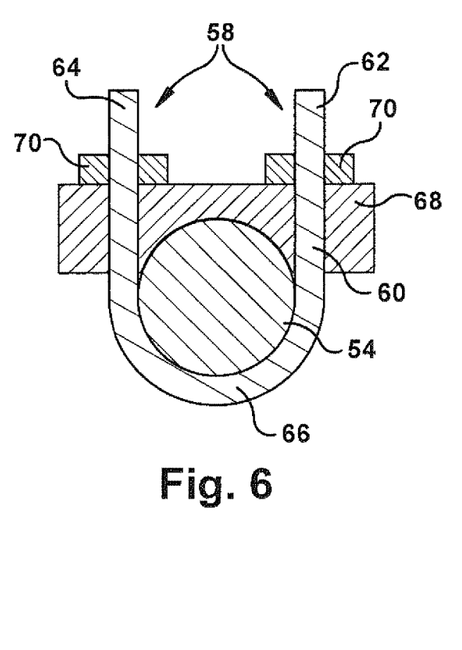
FIG. 6 illustrates an exemplary projection which may optionally be included on parallel links of the front conveyor.

Each link 54 may include one or more projections 58 adapted to engage the uprooted guayule shrubs to aid in conveying the guayule shrubs up the front conveyor. The projections may be configured in a variety of ways. These projections may be an integral part of the parallel links 54 or may be added later as an after-market modification. For example, FIG. 6 illustrates one exemplary embodiment of projections added as an aftermarket modification. In the exemplary embodiment, the link 54 is illustrated as a round rod with a substantially circular cross-section. In other embodiments, however, the link 54 may have a non-circular cross-section, such as rectangular, or may have an irregular cross-section. A U-bolt 60 is placed on the link 54. The U-bolt 60 includes a first threaded end 62 generally parallel to a second threaded end 64 and connected by a bend section 66. In the illustrated embodiment, the bend section 66 has a round bend with substantially the same radius of curvature as the radius of the link 54. In other embodiments, however, the bend section 66 can be semi-round, squared, or any shape suitable for attaching to the link. When placed on the link 54, the U-bolt is arranged such that the first and second threaded ends 62, 64 face upward or outward to form the projections 58. The U-bolt 60 is secured in place by a bracket 68 and a pair of threaded nuts 70. The first and second threaded ends 62, 64 are received through fastener holes 70 formed in the bracket and the bracket is positioned to abut the link 54. The nuts 70 are threaded onto the threaded ends 62, 64 and tightened against the bracket. In use, the first and second threaded ends 62, 64 act as upward extending projection 58 as shown in FIG. 4.

The front conveyor 50 is rotatably connected to the frame 14 and capable of rearward rotation at, at least, a first speed. The harvester 10 may include at least one front drive sprocket 71 that engages at least one of the endless chains or belts for rotating the front conveyor 50. The cage 30 is positioned to at least partially surround the front conveyor 50 to help retain the uprooted shrubs within the harvester 10 during operation. In addition, the cage 30 is designed such that the cross support members 34 are at least about 3 feet (at least about 1 meter) above the upper side of the front conveyor 50 to provide adequate clearance for the uprooted shrubs to be moved upward along the front conveyor 50. Optionally, the front conveyor may be a first front conveyor and the harvester may further comprise (also include) a second front conveyor which is arranged in parallel to the first front conveyor.

The exemplary embodiment of the harvester 10 also includes a rear conveyor 72 positioned rearward of the front conveyor 50 between the pair of laterally spaced sidewalls 22. The rearward conveyor 50, similar to the front conveyor 50, includes a pair of endless chains or belts 74 and a plurality of parallel links 76 connected at their ends, in relation to the pair of endless chains or belts. The parallel links 76 are substantially evenly spaced along the length of the chains or belts 74. In one exemplary embodiment, the rear conveyor 72 has regularly spaced openings 78 between the links 76 of about 2 inches to about 6 inches. In certain embodiments, the rear conveyor 72 has regularly spaced openings between the links 76 of 2 inches to 6 inches (5 cm to 15 cm), about 3 inches to about 5 inches (about 7.5 cm to about 12.5 cm), or 3 inches to 5 inches (7.5 cm to 12.5 cm). The rear conveyor 72 includes a first section 80 adjacent the front conveyor 50 and inclined toward the rearward end 20 and a second section 82 positioned between the first section 80 and the rearward end 20 and declined toward the rearward end. The first section 80 of the rear conveyor 72 may be inclined at an angle $A_2$ substantially similar to the angle $A_1$ of the front conveyor 50. In some embodiments, however, the incline angle $A_2$ of the first section 80 may differ from the incline angle $A_1$ of the front conveyor 50. In certain embodiments, the incline angle $A_2$ of the first section 80 is steeper than the incline angle $A_1$ of the front conveyor 50 and in other embodiments, the incline angle $A_2$ is less steep than the incline angle $A_1$.

The rear conveyor 72 is rotatably connected to the frame 14 and capable of rearward rotation at, at least, a second speed that is greater than the first speed of the front conveyor 50. The harvester 10 may include at least one rear drive sprocket 84 that engages at least one of the endless chains or belts 74 for rotating the rear conveyor 72. The increased speed of the rear conveyor 72 relative to the speed of the front conveyor 50 causes increased agitation of the guayule shrubs 11 as the shrubs transition from the front conveyor to the rear conveyor. The increased agitation aids in separating residual soil from the uprooted guayule shrub conveyed by the front conveyor 50. In other embodiments, increased agitation over the normal agitation imparted by the front conveyor 50 may be obtained by an agitator other than a second conveyor. Such an agitator is represented in FIG. 2 as 85. Any agitating device capable of increasing agitation of the guayule shrubs while in the harvester may be used. For example, the agitator may cause increased vibration or shaking of the first conveyor, the harvester, or the guayule shrubs.

In the exemplary embodiment, the front conveyor 50 and the rear conveyor 72 each have a width that substantially spans the distance between the laterally spaced side walls 22. In other embodiments, however, the width of the front conveyor 50 may differ from the width of the rear conveyor 72 and either or both of the front conveyor 50 and the rear conveyor 72 may have a width that does not substantially span between the laterally spaced side walls 22. For example, in one exemplary embodiment, the harvester 10 includes two parallel front conveyors, each having a width that spans less than half of the distance between the laterally spaced side walls 22.

The front conveyor 50 and the rear conveyor 72 may be powered by any suitable power source. For example, the harvester 10 may be designed to be attached to, pulled and powered by a farm tractor (not shown). In certain embodiments, the harvester 10 is designed to be attached to a tractor, pulled by a tractor, powered by a tractor, or a combination thereof. In other embodiments, however, the harvester 10 may be integrated into a self-propelled vehicle and use its own power source to drive the conveyors. In the exemplary embodiment, the frame 14 includes an attachment mechanism 90 to facilitate attaching the harvester 10 to a tractor. In addition, the harvester 10 includes a first drive shaft 92, a second drive shaft 94, and a transmission or gear box 96. The first drive shaft 92 extends from the forward end 18 of the harvester 10 and is capable of attaching to an output shaft (not shown) on a tractor. The first drive shaft 92 is rotatably mounted to the frame 14 and operably coupled to the front conveyor 50 to drive the front conveyor at the first speed. The first driveshaft 92 is rotated at a first rotational speed by the output shaft from the tractor. The second drive shaft is rotatably mounted to the frame 14 and operably coupled to the rear conveyor 72 to drive the rear conveyor at the second speed. The transmission 96 is operably coupled to the first drive shaft 92 and to the second drive shaft 94. The transmission 96 converts the first rotational speed to a second rotational speed that is faster than the first rotational speed. The transmission 96 transmits the second rotational speed to the second drive shaft. In other embodiments, the harvester 10 may include one or more hydraulic motors (not shown) for driving the front conveyor 50 and the second conveyor 72. The hydraulic motors may be run from the tractor's auxiliary hydraulic supply. One hydraulic motor may power both the front and rear conveyors or each conveyor may include a separate hydraulic motor.

The exemplary embodiment of the harvester 10, in operation, is attached to a farm tractor via the attachment mechanism and the first drive shaft is connected to the output shaft of the tractor. The tractor pulls the harvester behind the tractor to engage the guayule shrubs. As the harvester is pulled, the forward projecting digger blade extends about 3 inches to about 10 inches into the soil when downwardly engaged. As a result, the blade is able to harvest the guayule shrubs as the blade moves through the soil. In some embodiments, the front edge of the blade may be blunt (i.e., it does not necessarily contain a cutting or knife-like edge); thus, the blade can dislodge the guayule plant with a majority of the largest part of the root intact. The digger blade is arranged on the forward end of the harvester to direct the uprooted guayule shrub toward the front conveyor. Along with the harvested shrub, a certain amount of dirt (some attached to the root and some loose) will be thrown upward onto the front conveyor.

The first drive shaft is rotated by the output shaft of the tractor and is operatively coupled to the front drive sprocket to drive the front conveyor. The first drive shaft is also operably coupled to the transmission. The transmission receives the rotational input from the first drive shaft and converts the rotational input to a rotational output at a faster rotational speed. The second drive shaft is operably coupled to the transmission to receive the rotational output and is also operably coupled to the rear drive sprocket to drive the second conveyor at a speed greater than the speed of the front conveyor.

The uprooted guayule shrub and soil that is directed to the front conveyor by the digger blade is conveyed by the front conveyor upward and toward the rearward end of the harvester. When present, the projections on the links of the first conveyor engage and assist in transitioning the uprooted guayule shrub onto the front conveyor. As the guayule shrub is transported along the front conveyor, some residual soil that is attached to the guayule roots as well as loose soil that has been thrown up onto the front conveyor falls off and drops through the openings between the conveyor links, through the open bottom of the frame, and onto the ground.

The front conveyor then moves the guayule shrub to the rear conveyor. When the guayule shrub transitions from the front conveyor to the rear conveyor, the increased rotational speed of the rear conveyor causes increased agitation to the guayule shrub. The increased agitation to the guayule shrub causes additional residual soil that is attached to the uprooted guayule to fall off and drop through the openings between the conveyor links, through the open bottom of the frame, and onto the ground.

The rear conveyor then transports the guayule shrub up the inclined first portion and downward along the declined second portion. The rear conveyor then directs the guayule scrubs out of the outlet at the rearward end of the harvester where the shrubs may be deposited into a carrier associated with the harvester or deposited on the ground for later retrieval by another machine or manually. In certain embodiments, the rear conveyor deposits the shrubs onto the ground in a row-like pattern in order to assist with later retrieval by another machine.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative compositions and processes, and illustrative examples shown and described. Accordingly, departures may be made from such details without departing from the spirit or scope of the general inventive concept.

The invention claimed is:

1. A harvester for harvesting guayule shrub from soil, comprising:
    a wheeled frame including at least two wheels and having a forward end and a rearward end;
    a pair of laterally spaced sidewalls on said frame defining a passage extending from the forward end to the rearward end;
    a front conveyor positioned between the pair of laterally spaced sidewalls and inclined from the forward end toward the rearward end, the front conveyor capable of rearward rotation at a first speed;
    a forward projecting flat digger blade having an irregular front edge with either a plurality of peaks and valleys or with one valley, the forward projecting digger blade positioned forward of the front conveyor and capable of downward engagement into the soil for uprooting guayule shrub, the digger blade arranged to direct uprooted guayule shrub toward the front conveyor;
    an agitator comprising a rear conveyor positioned rearward of the front conveyor between the pair of laterally spaced sidewalls, wherein the rear conveyor comprises a continuous chain or belt having regularly spaced openings of about 2 inches to about 6 inches, the rear conveyor rotatably connected to the frame; and
    an outlet positioned at the rearward end of the harvester out of which outlet the guayule shrub is directed,
    wherein the harvester is capable of agitating an uprooted guayule shrub while in the harvester.

2. The harvester of claim 1 wherein the conveyor is capable of rearward rotation at a second speed that is greater than the first speed.

3. The harvester of claim 2 further comprising a first drive shaft rotating at a first rotational speed to drive the front conveyor at the first speed, a second drive shaft rotating at a second rotational speed for driving the rear conveyor at the second speed, and a transmission operably coupled to the first drive shaft and to the second drive shaft for converting the first rotational speed to the second rotational speed.

4. The harvester of claim 2, wherein the rear conveyor includes a first section adjacent the front conveyor and inclined toward the rearward end of the wheeled frame and a second section between the first section and the rearward end of the wheeled frame and declined toward the rearward end of the wheeled frame.

5. The harvester of claim 1 further comprising a partially enclosed cage engaged with the pair of laterally spaced sidewalls, the cage positioned to at least partially surround the front conveyor.

6. The harvester of claim 5, wherein the cage includes at least two upwardly projecting supports connected by a cross member.

7. The harvester of claim 6, wherein the front conveyor has an upper side having a distance of at least 3 feet from the cross member.

8. The harvester of claim 1, wherein the front conveyor comprises an endless chain or belt having regularly spaced openings of about ½ inch to about 3 inches, the front conveyor rotatably connected to the frame.

9. The harvester of claim 1, wherein the forward projecting digger blade extends about 3 inches to about 10 inches into the soil when downwardly engaged.

10. The harvester of claim 1, wherein the front conveyor comprises a plurality of parallel links connected at their ends, in substantially evenly spaced relation, to a pair of endless chains or belts, at least one of the endless chains or belts engaging a drive sprocket for rotating the front conveyor.

11. The harvester of claim 2, wherein the rear conveyor comprises a plurality of parallel links connected at their ends, in substantially evenly spaced relation, to a pair of endless chains or belts, at least one of the endless chains or belts engaging a drive sprocket for rotating the front conveyor.

12. The harvester of claim 1, wherein the front conveyor comprises a plurality of parallel links connected at their ends to a pair of endless chains or belts, at least one parallel link having one or more projections extending outward from the link to engage the uprooted guayule shrub.

13. The harvester of claim 1, wherein the harvester further comprises its own power source.

14. The harvester of claim 1, wherein the front edge of the digger blade has a cutting or knife-like edge.

15. A process for harvesting guayule shrubs, the process comprising
    (a) providing a harvester comprising:
        a wheeled frame including at least two wheels and having a forward end and a rearward end;
        a pair of laterally spaced sidewalls on said frame defining a passage extending from the forward end to the rearward end;
        a front conveyor positioned between the pair of laterally spaced sidewalls and inclined from the forward end toward the rearward end, the front conveyor capable of rearward rotation at a first speed;
        an outlet positioned at the rearward end of the harvester out of which outlet the guayule shrub is directed,
        a forward projecting flat digger blade having an irregular front edge with either a plurality of peaks and valleys or with one valley, the forward projecting digger blade positioned forward of the front conveyor and capable of downward engagement into the soil for uprooting guayule shrub, the digger blade arranged to direct uprooted guayule shrub toward the front conveyor; and an agitator comprising a rear conveyor positioned rearward of the front conveyor between the pair of laterally spaced sidewalls, wherein the rear conveyor comprises a continuous chain or belt having regularly spaced openings of about 2 inches to about 6 inches, the rear conveyor rotatably connected to the frame;

wherein the harvester is capable of agitating the uprooted guayule shrub while in the harvester;

(b) providing planted guayule shrubs, (c) harvesting the planted guayule shrubs by uprooting the guayule shrubs using the harvester and conveying the uprooted shrubs toward the rearward end of the wheeled frame via the front conveyor and out the outlet.

16. The process of claim 15, wherein the harvesting includes attaching the harvester to a tractor and pulling the harvester, powering the harvester, or a combination thereof.

17. The process of claim 15, wherein the harvesting includes propelling the harvester by its own power source.

* * * * *